Patented Nov. 7, 1922.

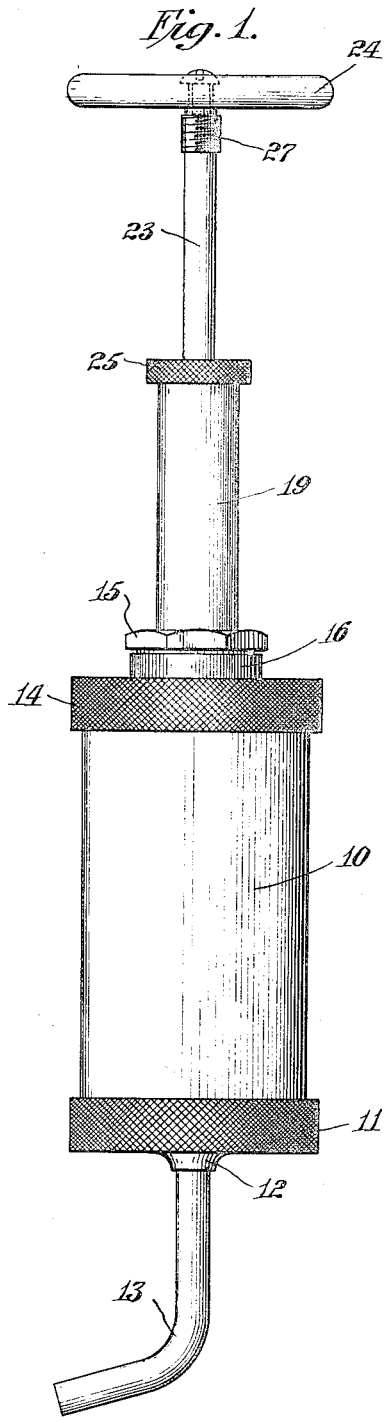
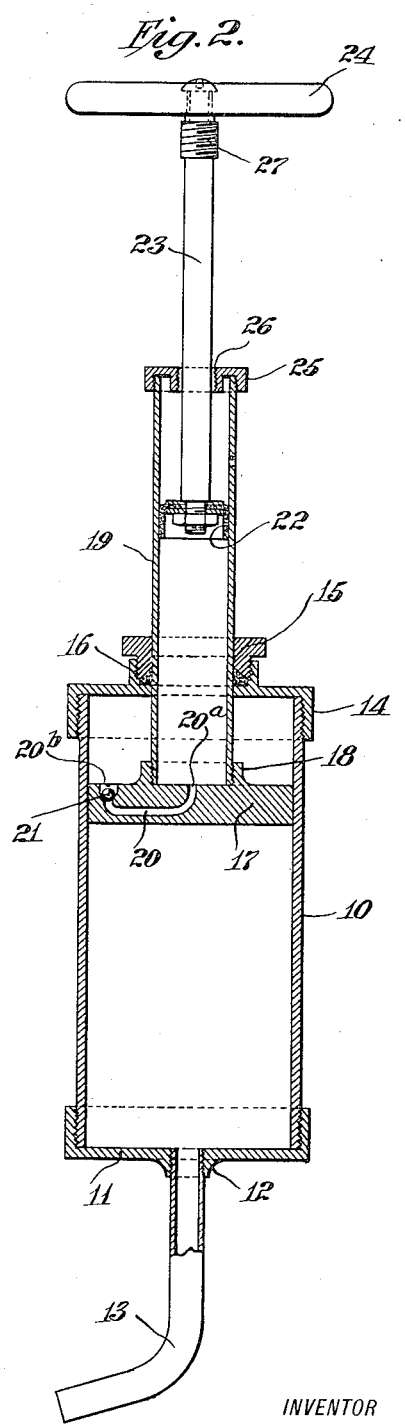

1,435,034

UNITED STATES PATENT OFFICE.

LOUIS ULLMAN, OF NEW YORK, N. Y.

GREASE GUN.

Application filed November 29, 1919. Serial No. 341,398.

*To all whom it may concern:*

Be it known that I, LOUIS ULLMAN, a citizen of the United States, residing at New York city, in the county and State of New York, have invented certain new and useful Improvements in Grease Guns, of which the following is a specification.

My invention relates to pumps, particularly of the type used for ejecting heavy grease, and commonly termed "grease guns."

For lubricating the gear box and other parts of motor vehicles it is cutomary to employ heavy grease which is almost solid in consistency, and can not ordinarily be ejected from the usual type of pump adapted for handling lighter fluids, such as oil or water.

Various forms of pumps have been proposed for the purpose stated, but so far as I am aware, none of these has been satisfactory, and one object of my invention is to provide a grease gun wherein compressed air is availed of to expel the grease with great ease from the pump.

Another object of the invention is to so construct the device that the grease ejecting means therein may either be actuated by compressed air or by physical or mechanical pressure, at the will of the operator.

The invention consists of the structural features and combinations of parts hereinafter fully described with reference to the accompanying drawing, wherein Fig. 1 is a side elevational view of the improved grease gun, and Fig. 2 is a central longitudinal section thereof.

Similar reference characters refer to like parts in the several views.

In the drawing, 10 denotes the casing or cylinder to receive the grease used for lubricating purposes. Threaded to the lower end of the casing 10 is a removable cap 11 having a central nipple 12 designed to receive a nozzle 13 through which the grease is ejected to the desired point of application.

The upper end of cylinder 10 is closed by a cap 14, which may be and preferably is removably attached to the cylinder, as by being threaded thereto. The cap is formed with a stuffing box 15 carried at the upper end of a reduced neck 16 projecting upwardly from the cap 14.

Reciprocable in the cylinder 10 is a piston 17, the inner face of which is provided with an internally threaded nipple 18 into which is adapted to screw the lower externally threaded end of a hollow piston rod 19, which passes through the stuffing box 15. The piston is formed with an air duct or passage 20, preferably curved as shown, and having its inlet end 20ᵃ opening into the piston rod 19 and its outlet end 20ᵇ opening into the space in the rear of the piston and controlled by the check valve 21.

Slidable within the piston rod 19 is a cupped washer or plunger 22 of flexible material, such as leather, carried at one end of a stem 23 the opposite end of which is provided with a handle 24.

Mounted on the upper end of the piston rod is a somewhat conical cap 25 internally threaded at its smaller diameter, as at 26, and the stem 23 is provided with screw threads 27 below the handle 24. Ordinarily the stem is slidable through the opening in the cap, but the cap and stem may be secured together, as presently described.

The device operates substantially as follows:—To fill the cylinder 10 with grease the cap 11 is removed and the grease may be placed into the cylinder by an outside instrumentality or the lower open end of the cylinder may be placed over or immersed in the grease supply and the piston 17 retracted whereby the grease is drawn into the cylinder, and thereupon the cap 11 is replaced. If it be desired to expel quantities of the grease from cylinder 10 through the medium of compressed air the threads 27 of the stem 23 remain disconnected from the threads 26 of the cap 25 and the handle 24 is moved up and down a number of times whereby the plunger 22 will compress and force air through the duct 20 into the space in rear of the piston 17. The check valve 21 will prevent back flow of the compressed air, and as the latter expands it will force the piston 17 down in the cylinder 10 and cause ejection of the grease through the nozzle 13. I have found, in practice, that an adequate quantity of compressed air for forcing the piston down in the cylinder is obtained by reciprocating the handle 24 two or three times.

If it be desired to force the piston down in the cylinder by a direct mechanical push against the same, as distinguished from the expansive force of the compressed air, the threads 27 of the stem 23 may be engaged with the threads 26 of cap 25, whereby the stem and piston practically form an entity united to the piston 17 and movement of the handle 24 up or down will cause corresponding movement of the piston 17 in casing 10.

With the construction of grease gun above described I have used very heavy grease and have been able to eject it from the cylinder with very little effort, the grease issuing as easily as though it were very light oil or water.

I claim:—

1. A grease gun, comprising a cylinder, a piston movable therein, and means carried by the piston and movable axially thereof for producing and forcing compressed air through a passage in said piston into a space in the cylinder in the rear of the piston.

2. A grease gun, comprising a cylinder, a piston movable therein and having an air duct both ends of which terminate in the rear face of the piston, and means carried by the piston and movable axially thereof for producing and forcing compressed air through one of said ends of said duct into a space in the cylinder in the rear of the piston.

3. A grease gun comprising a cylinder having a piston movable therein, said piston provided with an air duct having an inlet through which compressed air may pass and an outlet in the rear face of said piston whereby compressed air may escape into the space in the rear of the piston, and a check valve located at the outlet end of said duct.

4. A grease gun, comprising a cylinder, a piston movable therein and having an air duct both ends of which terminate in the same face of the piston, the outlet end of said duct opening into the cylinder, a hollow piston rod secured to the piston over the inlet end of the air duct, and means movable in the piston rod for compressing air and forcing the same through the duct into a space in the cylinder in the rear of the piston.

5. A grease gun, comprising a cylinder, a piston movable therein and having an air duct therein, the outlet end of said duct terminating at a pont in the cylinder, a hollow piston rod secured to said piston and registering with the inlet end of said duct, a stem movable in said piston rod carrying means for compressing air therein, and means for releasably securing said stem and piston rod together.

In testimony whereof I have affixed my signature in presence of two witnesses.

LOUIS ULLMAN.

Witnesses:
CLARICE FRANCK,
PAULA WEBBER.